US012440410B2

(12) United States Patent
Bouchard et al.

(10) Patent No.: US 12,440,410 B2

(45) Date of Patent: Oct. 14, 2025

(54) SUPPORT ASSEMBLY ATTACHABLE TO A PATIENT SUPPORT AND PATIENT SUPPORT HAVING SAME

(71) Applicant: TECHNOLOGIES CGC INC., Quebec (CA)

(72) Inventors: Carl Bouchard, Quebec (CA); Philippe Ouellet, Quebec (CA)

(73) Assignee: TECHNOLOGIES CGC INC., Quebec (CA)

(*) Notice: Subject to any disclaimer, the term of this patent is extended or adjusted under 35 U.S.C. 154(b) by 40 days.

(21) Appl. No.: 18/316,536

(22) Filed: May 12, 2023

(65) Prior Publication Data

US 2023/0363965 A1 Nov. 16, 2023

Related U.S. Application Data

(60) Provisional application No. 63/341,642, filed on May 13, 2022.

(51) Int. Cl.

*A61G 7/075* (2006.01)

*A61G 1/04* (2006.01)

(52) U.S. Cl.

CPC ........... *A61G 7/0755* (2013.01); *A61G 1/042* (2016.11)

(58) Field of Classification Search

CPC ........ A61G 7/0755; A61G 1/042; A61G 5/10; A61G 7/05; A61G 1/04; A61G 13/101;

(Continued)

(56) References Cited

U.S. PATENT DOCUMENTS

| | | | |
|---|---|---|---|
| 4,511,158 | A | 4/1985 | Varga et al. |
| 5,152,486 | A | 10/1992 | Kabanek et al. |

(Continued)

FOREIGN PATENT DOCUMENTS

| | | | |
|---|---|---|---|
| DE | 102017110001 | A1 | 11/2018 |
| EP | 3944846 | B1 | 2/2025 |

(Continued)

OTHER PUBLICATIONS

European Search Report issued in co-pending European application No. 23173192.8 on Aug. 2, 2023.

*Primary Examiner* — Madison Emanski

(74) *Attorney, Agent, or Firm* — BCF LLP

(57) ABSTRACT

A support assembly attachable to a patient support is disclosed. The support assembly includes a support unit configured to support one or more devices, and two connector units removably attachable to the patient support. The support unit includes a shelf for supporting one or more devices, two support legs extending downwardly from the support shelf and spaced apart from each other, and two support feet. The two connector units each include a patient support attachment portion removably attachable to the patient support, and a support unit attachment portion removably attachable to the respective support unit. The support unit attachment portion and the respective support foot include inter-engageable elements which can be moved relative to one another to move the support unit between an extended position and a retracted position when the two connector units are attached to the support unit. A patient support assembly is also disclosed.

19 Claims, 10 Drawing Sheets

(58) Field of Classification Search

CPC .............. A61G 2203/78; A61G 7/0503; A61G 2203/80; A61G 1/00; A61G 12/002; A61G 12/008; A61G 13/107; F16M 13/022; F16M 11/041; F16M 13/02; F16M 2200/028; A61M 5/1415; A61M 2209/082; F16B 2/10; F16B 2/12; B60P 7/0815; A61B 90/50

USPC ..... 5/503.1, 507.1, 658, 600, 626, 285, 620, 5/624, 625; 108/49; 248/230.1, 121

See application file for complete search history.

(56) References Cited

U.S. PATENT DOCUMENTS

| | | | | |
|---|---|---|---|---|
| 5,362,021 | A | 11/1994 | Phillips | |
| 9,746,125 | B2 | 8/2017 | Bowman | |
| 11,007,951 | B1 | 5/2021 | Zarecky | |
| 2002/0011543 | A1 | 1/2002 | Chinn et al. | |
| 2002/0029418 | A1 | 3/2002 | Votel | |
| 2003/0046764 | A1* | 3/2003 | Smeed | A61G 1/04 5/503.1 |
| 2005/0223494 | A1* | 10/2005 | Ambrose, III | A61G 13/101 5/658 |
| 2008/0217910 | A1 | 9/2008 | Walke | |
| 2009/0308400 | A1* | 12/2009 | Wilson | A61B 90/57 128/845 |
| 2012/0262039 | A1 | 10/2012 | Daugbjerg et al. | |
| 2012/0304390 | A1* | 12/2012 | Perez | F16M 11/38 5/658 |
| 2014/0374564 | A1 | 12/2014 | Schroeder et al. | |
| 2014/0374565 | A1 | 12/2014 | Tan | |
| 2015/0041419 | A1 | 2/2015 | Hasegawa | |
| 2015/0090849 | A1 | 4/2015 | Breitweiser et al. | |
| 2015/0273138 | A1 | 10/2015 | Wolff et al. | |
| 2016/0031382 | A1 | 2/2016 | Chinn et al. | |
| 2016/0324701 | A1 | 11/2016 | Cambridge et al. | |
| 2017/0209318 | A1 | 7/2017 | Schroeder et al. | |

FOREIGN PATENT DOCUMENTS

| | | | | |
|---|---|---|---|---|
| WO | WO-2021062558 | A1 * | 4/2021 | A61M 5/1415 |
| WO | 2021168586 | A1 | 9/2021 | |

* cited by examiner

SUPPORT ASSEMBLY ATTACHABLE TO A PATIENT SUPPORT AND PATIENT SUPPORT HAVING SAME

CROSS-REFERENCE TO RELATED APPLICATIONS

This application claims the benefit of U.S. Provisional Patent Application Ser. No. 63/341,642, filed on May 13, 2022. The content of the aforementioned application is incorporated by reference herein.

TECHNICAL FIELD

The present technology relates to support assemblies attachable to patient supports such as stretchers, and patient supports including a support assembly attached thereto.

BACKGROUND

Patient supports include, for example, stretchers, wheelchairs, portable beds and stationary beds. In the case of transportation systems, often times, along with transporting the patient, there is often a need to transport equipment associated with the patient.

A number of factors must be taken into account when such equipment includes medical equipment relating to the patient. Medical equipment must be secured to the patient system to prevent injuries as well as damage to the equipment. This is even more pertinent during transportation of the patient on the patient support. Medical equipment can be heavy and cumbersome and often lack handles for ease of transportation. The manner of securing the equipment must not restrict access to either the equipment or the patient, and should allow the medical equipment to be installed and removed easily.

Current solutions for mounting medical equipment to patient transportation systems include attaching the medical equipment near the patient with straps or seat belts. The medical equipment is also sometimes placed on the patients themselves.

However, these current solutions are far from ideal. They do not secure the medical equipment in a manner which allows for one or more of: quick release, quick attachment, secure attachment, ease of access to the secured medical equipment, let alone taking into account the cumulative weight of the equipment. Additionally, current solutions can also hinder the patient being moved onto or off the patient system.

Furthermore, current solutions are not suitable for critical care patient transportation systems. A patient under critical care may be connected to multiple devices for sustaining or monitoring life. During transport of the patient, these devices must accompany the critical care patient. Current patient transport solutions cannot accommodate the numerous devices, and are not robust enough to support the numerous devices during transportation. Additionally, current solutions can make some of the devices inaccessible during patient transport.

Therefore, there is a desire for a support assembly that can overcome at least some of the above-described drawbacks.

SUMMARY

It is an object of the present technology to ameliorate at least some of the inconveniences present in the prior art.

According to one aspect of the present technology, there is provided a support assembly attachable to a patient support. The support assembly includes a support unit and two connector units. The support unit, which is configured to support the device, includes a shelf, two support legs and two support feet. The shelf has a support surface for supporting one or more devices. The two support legs extend downwardly from the support shelf and are spaced apart from each other. Each one of the support foot of the two support feet is at a distal end of a respective support leg. The two connector units are removably attachable to the patient support and to a respective support unit. Each connector unit includes a patient support attachment portion and a support unit attachment portion. The patient support attachment portion is removably attachable to the patient support. The support unit attachment portion is removably attachable to the respective support unit. The support unit attachment portion and the respective support foot include inter-engageable elements which can be moved relative to one another to move the support unit between an extended position and a retracted position when the two connector units are attached to the support unit.

In some embodiments, the inter-engageable elements includes a rail on the support unit attachment portion, and a channel defined by channel walls in the support foot, where the channel is configured to receive the rail. The rail and the channel being configured such that the rail is moveable longitudinally along the channel.

In some embodiments, when the support unit and the two connector units are connected, each rail is positioned inwardly of a channel base of the respective channel.

In some embodiments, each rail is on an outer surface of each connector unit, and each channel is defined in an inner surface of each support foot.

In some embodiments, the rail includes a rail neck connecting the rail to the outer surface of the connector unit, and the channel walls include a longitudinal opening along one side which is configured to receive the rail neck when the rail is received in the channel.

In some embodiments, each channel has a first channel end which is open, and each rail has a first rail end and a roller at the first rail end, the first rail end and the roller receivable in the first channel end.

In some embodiments, the inter-engageable elements can slide relative to each other along a plane, the plane being perpendicular to the support surface of the shelf.

In some embodiments, when the two connector units are connected to the support unit, the inter-engageable elements of the support unit attachment portion and the respective support foot have respective longitudinal axes which are parallel to each other.

In some embodiments, longitudinal axes of the inter-engageable elements of each support unit attachment portion and the respective support foot are perpendicular to the support surface of the shelf.

In some embodiments, each support leg is transverse to the support surface of the shelf.

In some embodiments, the support unit and the connector unit are configured such that a larger proportion of the rail is received in the channel in the retracted position compared to the extended position.

In some embodiments, the support unit and the connector unit are configured such that in the retracted position, the channel support unit is vertically aligned with the connector unit, and in the extended position, the support unit is displaced laterally from the connector unit.

In some embodiments, the support assembly further includes a locking assembly for locking the relative positions of the support unit and the connector units in one or both of the retracted position and the extended position.

In some embodiments, the locking assembly includes corresponding latch members on the support unit and the connector unit, a resilient member and an actuator. The resilient member is biased toward a locked position in which the latch members are engaged. The actuator, which when actuated causes the latch members to dis-engage in an unlocked position.

In some embodiments, the support assembly further includes a handle extending from at least one of the support feet or the support legs of the support unit.

In some embodiments, the actuator is a button disposed on an upper surface of the handle.

In some embodiments, the support assembly further includes at least one stop member extendable from the support unit to at least one of the connector units to maintain engagement of the inter-engageable members.

In some embodiments, the support assembly further includes at least one pole extending upwardly from the shelf.

In some embodiments, the support assembly further includes a connector attached to the support surface, the connector configured to removeably attach the device thereto.

In some embodiments, the support assembly further includes a foldable cylinder support attached to one of the support legs.

In some embodiments, the support assembly further includes at least one infusion pump fixation attached to one of the support legs.

In some embodiments, the support assembly further includes a power bar configured to electrically power at least one device when the support unit electrically connected to a source.

In another aspect of the present technology, there is provided a patient support assembly including a patient support and the support assembly according to the above aspect or according to the above aspect and one or more of the above embodiments. The patient support has a frame, and has a head end and a foot end. The support assembly is connected to the frame of the patient support at the foot end.

In some embodiments, when the support assembly is in the retracted position, the support unit is vertically above the foot end of the patient support, and when the support assembly is in the extended position, the support unit extends beyond the foot end of the patient support.

In some embodiments, the support assembly further includes at least one patient support pole attached to the frame at the foot end of the patient support and extending vertically from the frame.

Advantages

In certain embodiments, a support assembly is easily moveable between a retracted position and an extended position, thereby facilitating patient transfer.

In certain embodiments, the support assembly is configured with a mechanism to maintain the support assembly in the extended position and/or the retracted position.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example "A and/or B" is to be taken as specific disclosure of each of (i) A, (ii) B and (iii) A and B, just as if each is set out individually herein.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
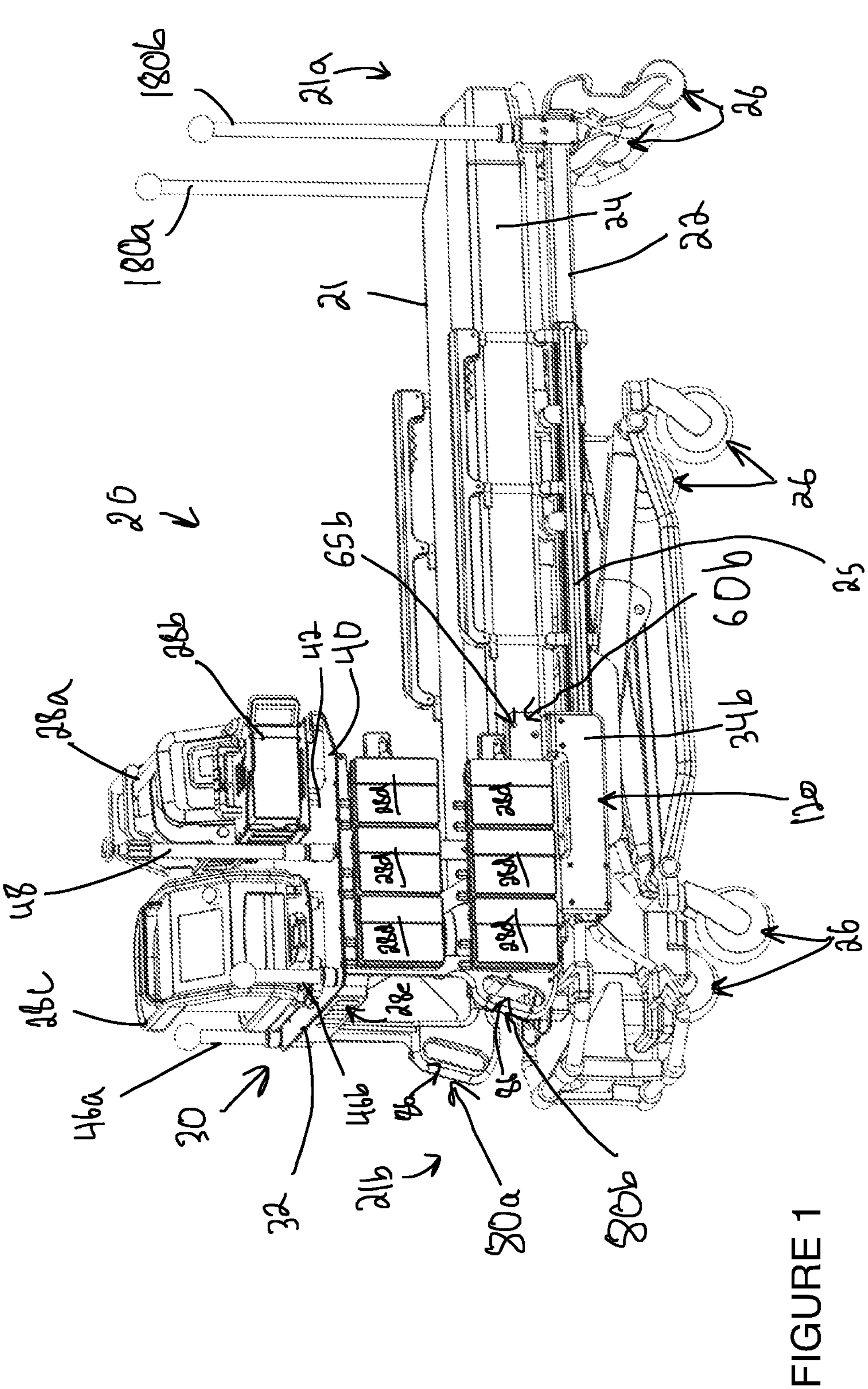
FIG. 1 is a perspective view taken from a top, rear, left side of a support assembly attached to a stretcher, with the support assembly in a retracted position, according to an embodiment of the present technology and medical equipment connected to the support assembly.
Figure 2:
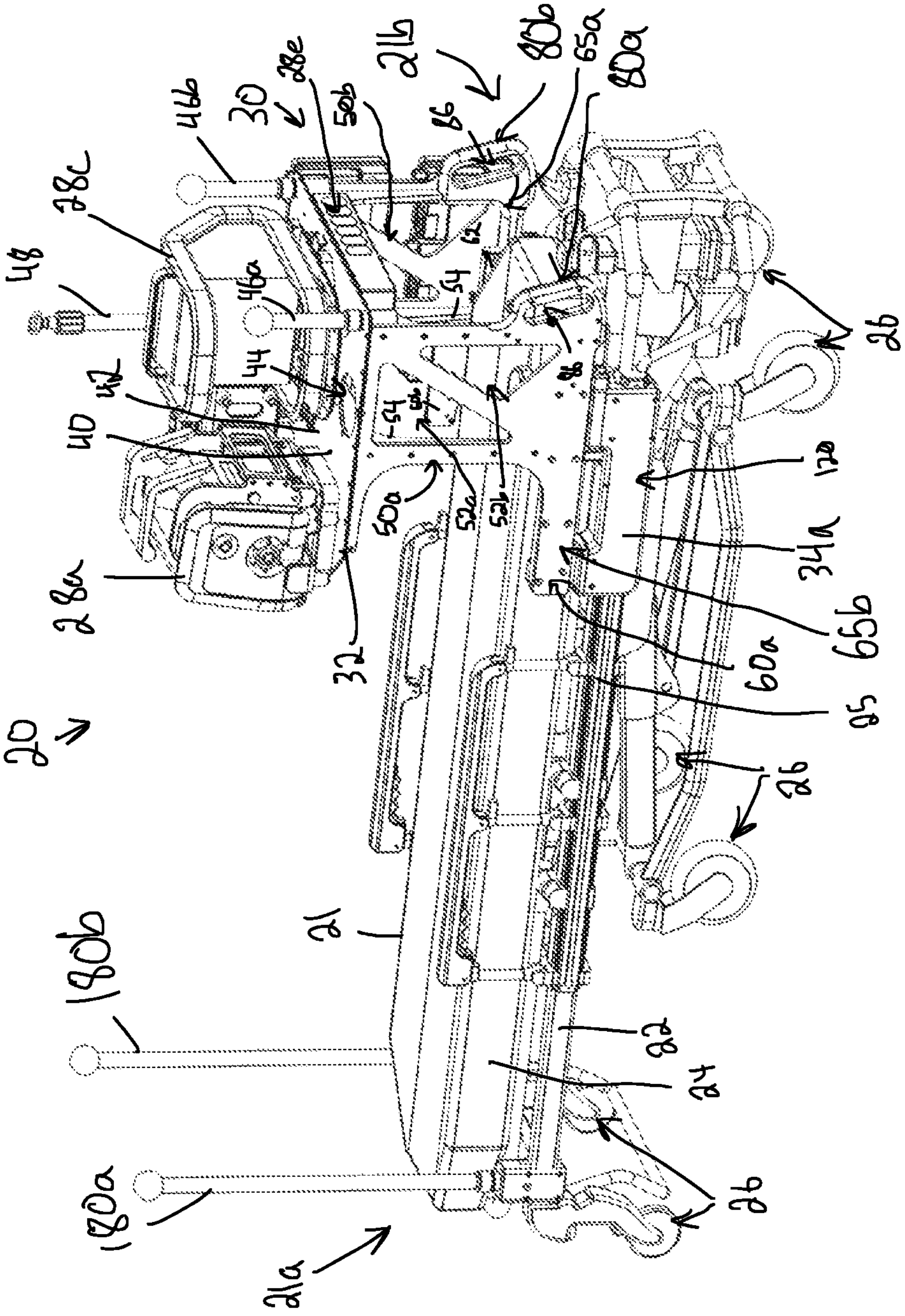
FIG. 2 is a perspective view taken from a top, rear, right side of the support assembly and stretcher of FIG. 1.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

According to embodiments of the present technology, there is provided a support assembly having a support unit and connector units. The connector units are removably connectable to a patient support. The support unit is, in turn, removably connectable to the connector units. The support unit is also connectable to devices such as medical devices, for example, ventilators. The support unit is configured for the devices to be easily and quickly connected thereto.

When the support unit is connected to the connector units, the support unit can move between retracted and extended positions, thereby providing clearance, which can, for example, be useful when transferring a patient from the patient transportation system to somewhere else, for example, to a bed. In certain embodiments, in the extended position, at least a portion of the support unit is moved beyond an end of the patient transportation system thereby moving it away from the patient providing clearance for the patient.

The patient support may be a stationary support such as a stationary bed or a patient transportation system such as a stretcher, a wheelchair or a portable bed, for example. The description and drawings herein refer to a stretcher as the patient support but it will be appreciated that the present technology is not limited to stretchers.

Referring to FIGS. 1 to 4, there is provided a support assembly 30, according to an embodiment of the present technology, which is connected to a stretcher 21. The support assembly 30 and the stretcher 21 together define a stretcher assembly 20 according to an embodiment of the present technology. It is contemplated that, instead of the stretcher 21, the support assembly 30 could be connected to another patient transport system or a patient support system such as a bed.

The stretcher 21, which has a head end 21*a* and a foot end 21*b*, includes a frame 22, a support body 24 and wheel assemblies 26. The support body 24, which is for supporting a patient, is connected to and supported by the frame 22. More specifically, the frame 22 surrounds the support body 24. In some embodiments, the frame 22 may only partially surround the support body 24, or be positioned differently with respect to the support body 24. The wheel assemblies 26, which are also connected to the frame 22, enable the stretcher 21 to be moved. In the present embodiment, the frame 22 is adjustable between a lower position and a higher position to adjust a height of the support body 24 relative to the ground. As is known, the frame 22 is typically adjusted to the lower position when moving the stretcher 21 for stability purposes.

The support assembly 30 is attachable to the stretcher 21 at either the head end 21*a* or the foot end 21*b*. In the accompanying figures, the support assembly 30 is connected to the foot end 21*b* of the stretcher 21. In some embodiments, the support assembly 30 could be attachable to the head end 21*a* of the stretcher 21, such that the support unit 30 would be configured to extend over an upper body of a patient. In such embodiments, an automated CPR could be attached to the support assembly 30. The support assembly 30 is configured to support a variety of devices so that a patient resting on the support body 24 is proximate to said variety of devices. In the embodiment shown in FIGS. 1 to 4, the devices include a ventilator 28*a*, a monitor 28*b*, a heart-lung support system 28*c* and six infusion pumps 28*d*. Furthermore, the support body 24 also includes a power bar 28*e*. In some embodiments, the power bar 28*e* is a hospital grade power bar that can supply the devices with electrical power when the support unit 24 is electrically connected to an electrical source. It is understood that the devices could be replaced with other devices without departing from the scope of the present technology. It is also contemplated that there could be more or less devices supported by the support assembly 30.

The support assembly 30 includes a support unit 32 and two connectors units 34*a*, 34*b*. As will be described below, the two connectors units 34*a*, 34*b* are removably attachable to the frame 22 of the stretcher 21 at opposite sides thereof, and the support unit 32 and the two connector units 34*a*, 34*b* are removably attachable to one another. When the support unit 32 and the two connector units 34*a*, 34*b* are attached to one another, the support unit 32 is moveable relative to the two connector units 34*a*, 34*b* between a retracted position in which the support unit 32 is vertically above the foot end 21*b* of stretcher 21 (FIGS. 1, 2 and 3) and an extended position in which the support unit 32 extends beyond the foot of the stretcher 21*b* (FIG. 4). The extended position is longitudinally displaced with respect to the stretcher 21 compared to the retracted position. Thus, the two connectors units 34*a*, 34*b* are fixedly connected to the stretcher 21, the support unit 32 is moveable relative to the stretcher 21. Moving the support unit 32 to the extended position can facilitate patient transfer from a lateral side of the stretcher 21.

Referring to FIGS. 1 to 7, the support unit 32 will first be described in greater detail. It will be appreciated from the following paragraphs that the support unit 32 is robust, in that it can, in many instances, withstand crashes.

The support unit 32 has a shelf 40 which has a support surface 42. In the present embodiment, the shelf 40 is generally horizontal. However, it is contemplated that in other embodiments, the shelf 40 could be angled relative to a horizontal plane (i.e., tilted). The shelf 40 has three connecting interfaces 42*a*, 42*b*, 42*c* (FIG. 5) that are configured to respectively connect with the ventilator 28*a*, the monitor 28*b* and the heart-lung support system 28*c*. In other embodiments, there could be more or less than three connecting interfaces. In the present embodiment, the three connecting interfaces 42*a*, 42*b*, 42*c* are similar to the technology described in WO 2021/062558 filed Oct. 2, 2020 and published Apr. 8, 2021. It is contemplated, however that connecting interfaces 42*a*, 42*b*, 42*c* could be different. In other embodiments, the connecting interfaces 42*a*, 42*b*, 42*c* could be omitted and the devices connected directly to the shelf 40. In some embodiments, the connecting interfaces 42*a*, 42*b*, 42*c* could be on a bottom of the shelf 40. The shelf 40 defines an aperture 44 configured to receive a cylindrical tank such as an oxygen tank. In some embodiments, the aperture 44 could be omitted. The shelf 40 also has two push bars 46*a*, 46*b* extending upwardly therefrom. The push bars 46*a*, 46*b* enable a person to push the support unit 32, to in turn, push the stretcher 21. The shelf 40 also has a foldable intravenous (IV) pole 48. It is understood that the shelf 40 could differ, for example by omitting the foldable IV pole 48, without departing from the scope of the present technology. It is to be appreciated that the support unit 32 can accommodate a plurality of medical devices, which may be particularly useful when the support assembly 30 is connected to a stretcher 21 supporting a critical care patient which requires numerous medical devices for sustaining or monitoring life.

The support unit 32 is generally quadrilaterally shaped and has a head side and foot side and two lateral sides. Support legs 50*a*, 50*b* extend from respective lateral sides of the shelf 40. Specifically, each of the support legs 50*a*, 50*b* is transverse to the support surface 42 of the shelf 40. It is contemplated that in other embodiments, the support legs 50*a*, 50*b* could extend from the shelf 40 at a different angle relative to the support surface 42. The support legs 50*a*, 50*b* are connected to the shelf 40 via a plurality of fasteners, specifically bolts. It is contemplated that in other embodiments, the support legs 50*a*, 50*b* could be connected to the shelf 40 differently, for example by an adhesive. In other embodiments, the support legs 50*a*, 50*b* could be integral with the shelf 40.

The support legs 50*a*, 50*b* are similar (mirror-images of one another), and hence, only the support leg 50*a* will be described in detail herein. The support leg 50*a* defines two apertures 52*a*, 52*b* having generally triangular shapes. It is contemplated that in other embodiments, there could be more or less than two apertures and/or that the apertures 52*a*, 52*b* could form other shapes for reducing weight of the support unit 32 while retaining structural integrity. The support leg 50*a* also has, on an inner side thereof (i.e., side of the support leg 50*a* facing the support leg 50*b*), and extending downwardly from the support surface 42, a reinforcing rib 54 for reinforcing the support leg 50*a*. The present configuration of the support leg 50*a* (i.e., the presence of the apertures 52*a*, 52*b*) reduces the amount of material required to manufacture the support legs 50*a*, 50*b* and weight while providing sufficient stability and structural integrity to support the shelf 40 when devices are connected thereto.

The support leg 50*a* notably differs from the support leg 50*b* in that there is a foldable supporting member 56 disposed on the inner side of the support leg 50*a*. The foldable supporting member 56 is configured to be generally aligned with the aperture 44 of the shelf 40 when in an unfolded position, and is configured to partially support a cylindrical tank that is received through the aperture 44. It is contemplated that in some embodiments, the foldable support member 56 could be omitted and/or that the pivotal support member 56 could be disposed on the support leg 50*b*. Furthermore, the support legs 50*a*, 50*b* also differs in that the support leg 50*b* has six pump fixations 58 on an outer side thereof for connecting with the six infusion pumps 28*d*.

The support unit 32 is also provided with a support foot 60*a* at a distal end of the support leg 50*a*, and a support foot 60*b* at a distal end of the support leg 50*b*. The support leg 50*a* is removably attachable to the connector unit 34*a* via the support foot 60*a*, and the support leg 50*b* is removably attachable to the connector unit 34*b* via the support foot 60*b*. Like the support legs 50*a*, 50*b*, the support feet 60*a*, 60*b* are similar (mirror-images of one another), and hence, only the support foot 60*a* will be described in detail herein.

Figure 10:
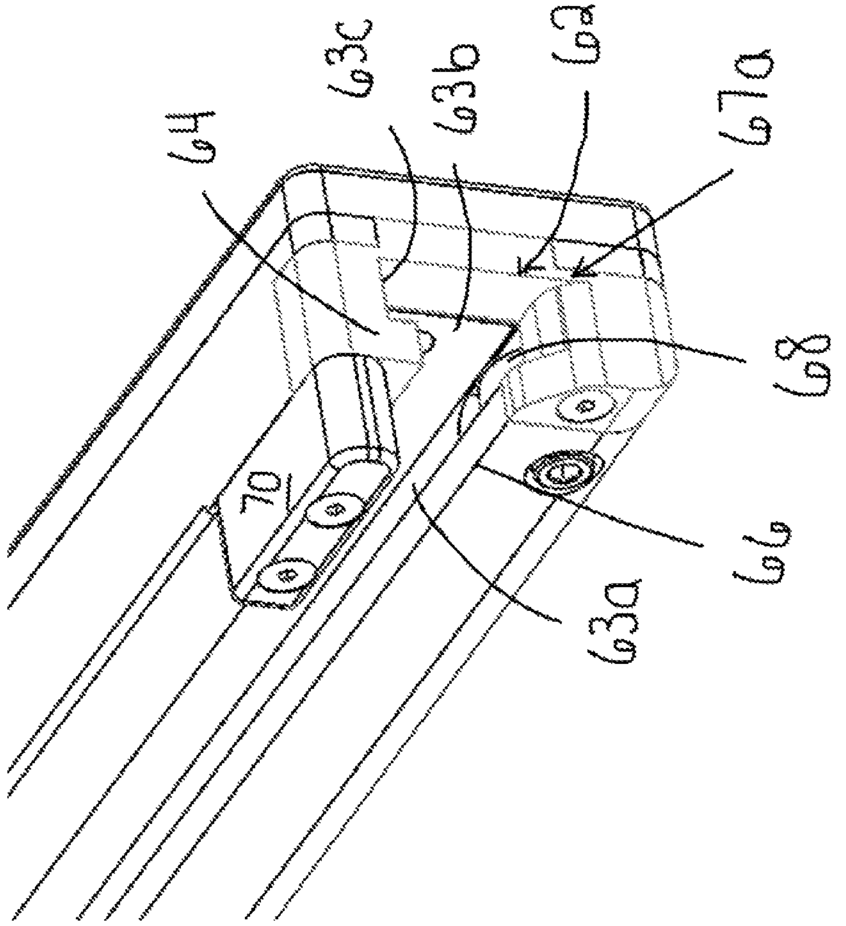
FIG. 10 is a close-up perspective view taken from a top, rear, right side of a portion of a support foot of the support assembly of FIG. 1.

The support foot 60*a* extends in a longitudinal direction, and has an inter-engageable element 62 that is engageable with an inter-engageable element 144 of the connector unit 34*a*. Specifically, in this embodiment, the inter-engageable element 62 is a channel 62 that is defined by channel walls 63*a*, 63*b*, 63*c* (FIG. 10) on an inner side 65*a* of the support foot 60*a*. It is contemplated that in other embodiments, the channel 62 could be defined on an outer side 65*b* of the support foot 60*b*. The channel 62 is open-ended on one end 67*a* for receiving the inter-engageable element 144 therein, and closed-ended on another end 67*b* for, in some instances, limiting movement of the support foot 60*a* (thus the support unit 32) relative to the connector unit 34*a*. Furthermore, the channel wall 63*a* has an upper lipped edge 64 and the channel wall 63*c* has a lower lipped edge 66. As will be described below, the upper and lower lipped edges 64, 66 can engage the inter-engageable element 144 for limiting lateral movement of the support foot 60*a* (i.e., in a direction perpendicular to the inner surface 65*a* of the support foot 60*a* relative to the connector unit 34*a*). The support foot 60*a* further has a roller 68 (FIG. 10) that is disposed within the channel 62 proximate to the open-end 67*a* thereof. More precisely, the roller 68 is disposed on a bottom side of the channel 62, below the channel wall 63*a*. In the present embodiment, the roller 68 is a bearing, but it is contemplated that the roller 68 could be another member such as a low friction wheel. As will be described in greater detail below, the roller 68 is configured to engage the inter-engageable element 144 and assists in easing movement of the support foot 60*a* relative to the connector unit 34*a*.

The support foot 60*a* further has an abutting portion 70 that is proximate to the open-end 67*a* of the channel 62 and that extends laterally from the inner side 65*a* of the support foot 60*a* (i.e., extends toward the support foot 60*b*). The abutting portion 70 is connected to the support foot 60*a* via fasteners. It is contemplated that in other embodiments, the abutting portion 70 could be connected differently, for example, via an adhesive. In other embodiments, the abutting portion 70 could be integral with the support foot 60*a*. The abutting portion 70 is configured to abut a stopping pin 170 for limiting longitudinal movement of the support foot 60*a* relative to the connector unit 34*a*. Thus, moving a position of the abutting portion 70 longitudinally along the support foot 60*a* would result in changing the longitudinal range of motion of the support foot 60*a* relative to the connector unit 34*a*.

Figure 6:
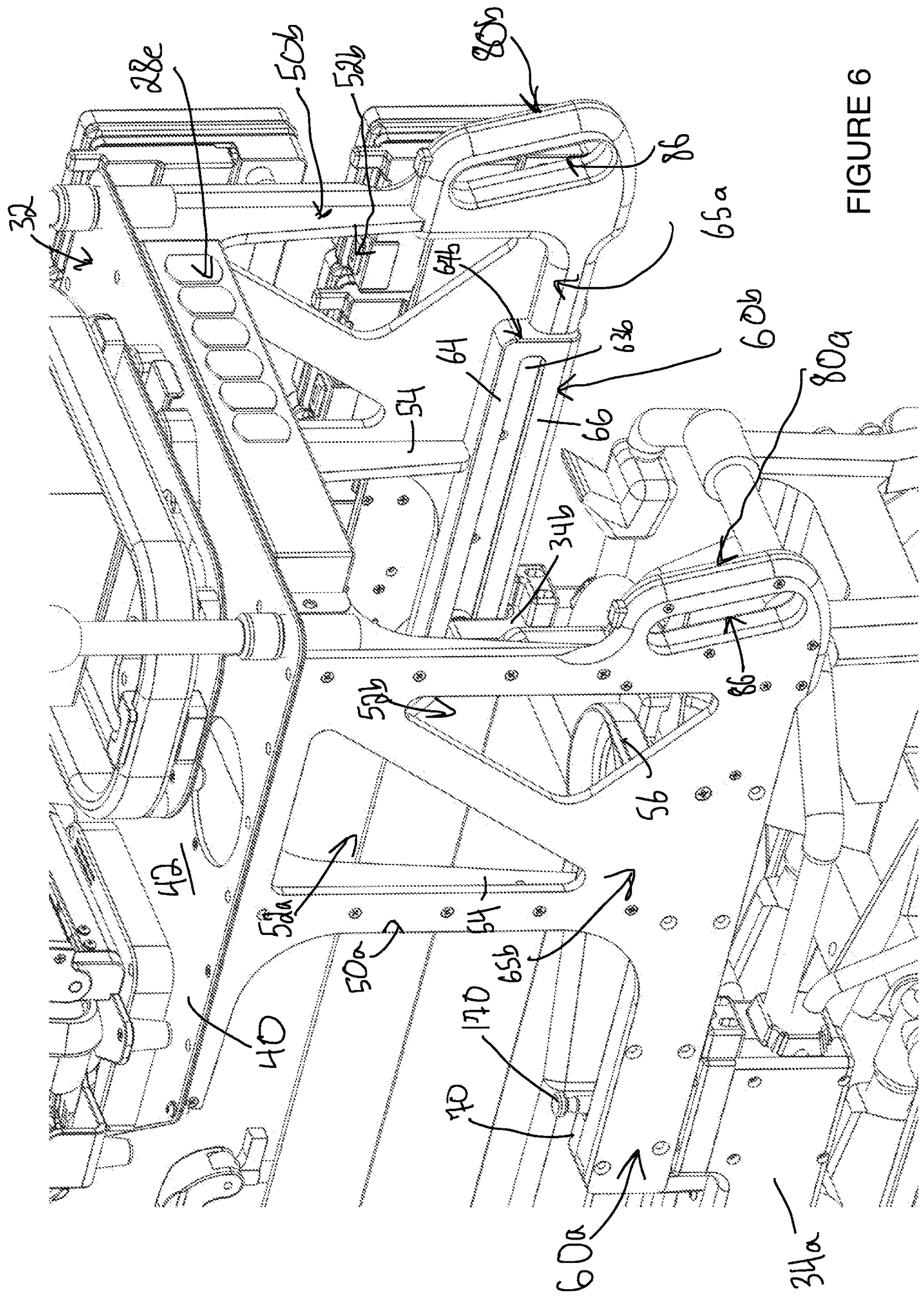
FIG. 6 is a close-up perspective view of the support assembly of FIG. 4.
Figure 7:
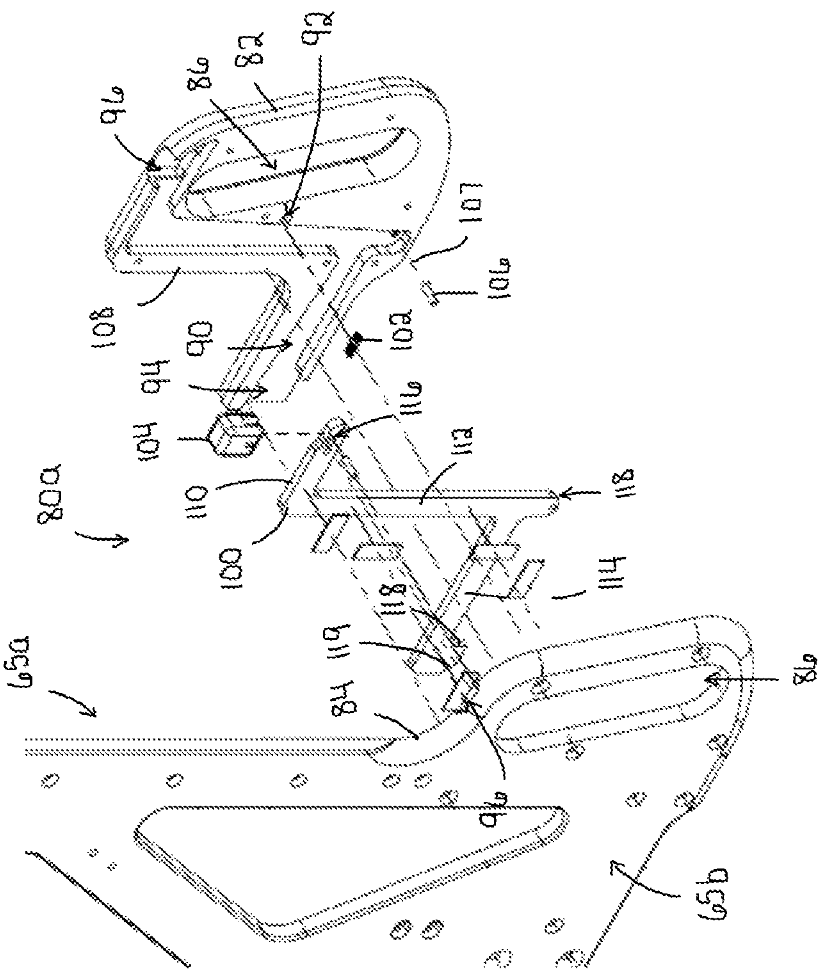
FIG. 7 is an exploded perspective view of a handle of the support assembly of FIG. 1.

Referring now to FIGS. 6 and 7, the support unit 32 also has a handle 80*a* extending from the support leg 50*a*, and a handle 80*b* extending from the support leg 50*b*. The handles 80*a*, 80*b* extend in a direction away from the lateral side of the shelf. In other embodiments, the handles 80*a*, 80*b* could extend from, respectively, the support feet 60*a*, 60*b*. Since the handles 80*a*, 80*b* are similar (mirror-images of one another), only the handle 80*a* will be described herein.

The handle 80*a* includes an inner portion 82 and an outer portion 84. The outer portion 84 is integral with the support leg 50*a*, and the inner portion 82 is removably connected to the outer portion 84 via fasteners. It is contemplated that in other embodiments, the inner and outer portions 82, 84 could be connected differently, or they could be one-piece. A locking assembly 86 of the support assembly 30 is received in the handle 80*a*, between the inner and outer portions 82, 84 (it is understood that the handle 80*b* also has a locking assembly 86).

The inner and outer portions 82, 84 each respectively define hand apertures 86 for receiving part of a hand in order to manipulate the handle assembly 80*a*. The inner and outer portions 82, 84 each further define a recessed portion 90 (only recessed portion of the inner portion 82 is shown) that is configured to receive a part of a latch member 100 of the locking assembly 86. As a result, the recessed portion 90 has a shape that is complementary to the shape of the latch member 100. The recessed portions 90 of the inner and outer portions 82, 84 also have a receiving section 92 configured to receive a resilient member 102 of the locking assembly 86, and has an open-ended section 94 from which part of the latch member 110 is configured to project. The inner and outer portions 82, 84 also each respectively define actuator apertures 96 on upper surfaces thereof that intersect with their respective recessed portions 90. Each of the actuator apertures 96 is configured to receive a part of the actuator 104.

With continued reference to FIGS. 6 and 7, the locking assemblies 86 will be described in greater detail. As mentioned above, the support assembly 30 has two locking assemblies 86. Each of the locking assemblies 86 includes the latch member 100, the resilient member 102, the actuator 104, a pivoting pin 106 and an actuating pin 108. Each of the locking assemblies 86 is adjustable between a locked position and an unlocked position. When one or both of the locking assemblies 86 are in the locked position, the support unit 32 is generally locked relative to the connector units 34*a*, 34*b* (i.e., prevented from being moved longitudinally), whereas when both of the locking assemblies 86 are in the unlocked position, the support unit 32 can move relative to the connector units 34*a*, 34*b*. It is contemplated that in some implementations of the present technology, there could be only one locking assembly 86. As the locking assemblies 86 are similar, only the locking assembly 86 of the handle 80*a* will be described herein.

The latch member 100 has an upper segment 110 extending generally horizontally, an intermediate segment 112 extending generally vertically from the upper segment 110, and a lower segment 114 extending generally horizontally from the lower segment 114. The upper and lower segments 110, 114 are parallel, though they may not be parallel in other embodiments.

The upper segment 110 defines a slot 116, extending longitudinally, that is configured to receive the actuating pin 108 therein. The slot 116 is sloped such that an end of the slot 116 closer to the intermediate segment 112 is vertically lower than the other end. This orientation can assist the locking assembly 86 to return toward the locked position.

The intermediate segment 112 defines a pivoting aperture 118 vertically below the intersection of the intermediate and lower segments 112, 114. The pivoting aperture 118 receives the pivoting pin 106, which defines a lateral axis 107, and which is also connected to the handle 80*a*. Thus, the latch member 100 is pivotally connected to the inner and outer portions 82, 84 by the pivoting pin 106, such that the latch member 100 is pivotable about the lateral axis 107.

The lower segment 114 has a hook portion 118 that extends vertically downwardly, and that has a tapered edge 119. The hook portion 118 is configured to extend from the open-ended section 94 when the locking assembly 86 is in the locked position.

The resilient member 102 is a spring, but it is contemplated that the resilient member 102 could be another resilient member such as an elastic member, a shape memory alloy, or the like. The resilient member 102 is received in the receiving section 92, and abuts the intermediate segment 112. It is contemplated that in other embodiments, the resilient member 102 could be disposed elsewhere. For instance, in some embodiments, the resilient member 102 could abut the upper segment 110. As will be described below, the resilient member 102 is configured to bias the locking assembly 86 toward the locked position.

The actuator 104 is a button. It is contemplated that the actuator 104 could be another actuator such as a lever. The actuator 104 is received through the actuator apertures 96 of the inner and outer portions 82, 84, and is operatively connected to the latch member 100. Specifically, in this embodiment, the actuator 104 is connected to the latch member 100 by the actuating pin 108, which extends through the slot 116. As will be described below, in response to the actuator 104 being actuated (i.e., pressed), the latch member 100 moves from a locked position to an unlocked position corresponding to, respectively, the locking assembly 86 being in the unlocked position and the locked position.

It is to be noted that the configuration of the locking assemblies 86 position the actuators 104 at a top of the handles 80*a*, 80*b*. This can assist in reducing a likelihood of the actuators 104 being actuated by accident (such as by the person operating the stretcher).

Adjustment of the locking assembly 86 between the locked and unlocked positions will now be briefly described. At rest, the locking assembly 86 is in the locked position. In the present embodiment, the locking assembly 86 is biased to the locked position by the resilient member 102. Upon actuation of the actuator 104, the actuating pin 108 moves through the slot 116, and the latch member 100 moves. Specifically, the movement of the latch member 100 is a pivotal movement about the lateral axis 107. The pivotal motion of the latch member 100 is such that the hook portion 118 moves upwardly (i.e., away and out of the open-ended section 94). Also, the intermediate segment 112 resiliently deforms the resilient member 102. As a result of the resilient deformation, the resilient member 102 biases the intermediate segment 112, and thus the latch member 100, back towards the initial position. Therefore, upon release of the actuator 104, the resilient member 102 biases the latch member 100 toward the locked position, such that the locking assembly 86 returns to the unlocked position.

Figure 8:
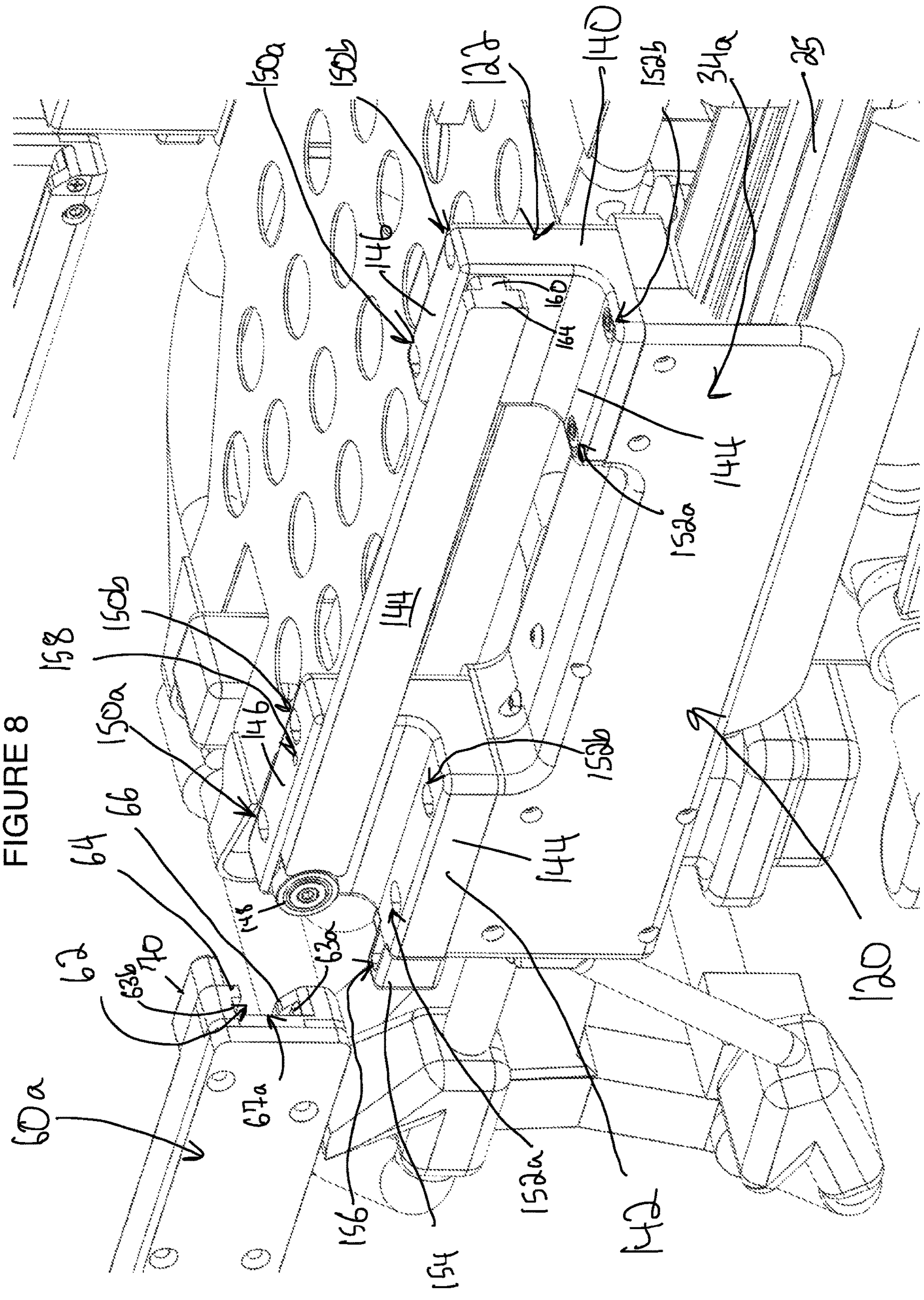
FIG. 8 is a close-up perspective view taken from a top, rear, right side of a connector unit of the support assembly of FIG. 1.
Figure 9:
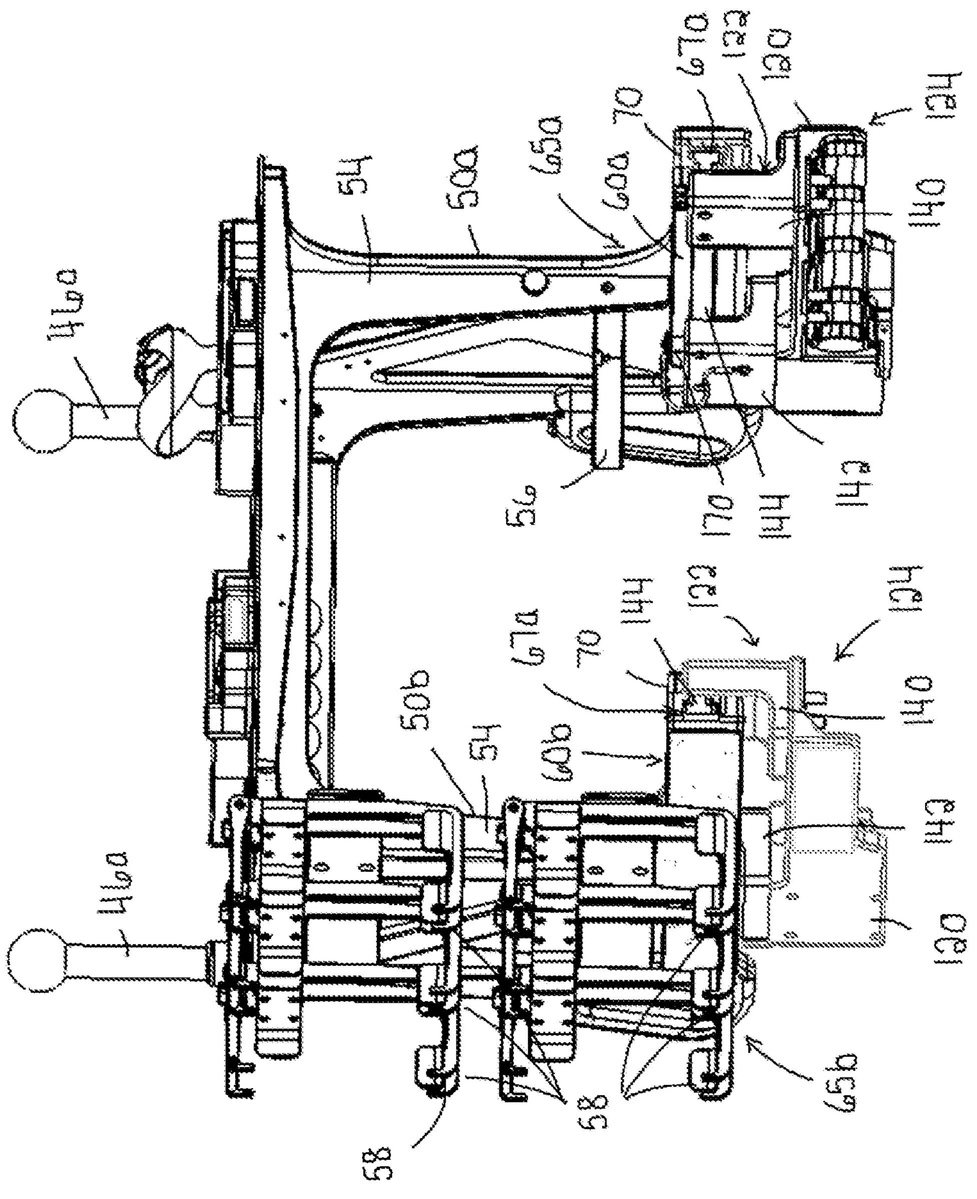
FIG. 9 is a perspective view taken from a bottom, rear, right side of the support assembly of FIG. 1.

Referring now to FIGS. 8 and 9, the connector units 34*a*, 34*b* will now be described in greater detail. It will be appreciated from the following paragraph that, like the support unit 32, the connector units 34*a*, 34*b* are configured to be robust, so that the support assembly 300 can, in some instances, withstand crashes. The connector units 34*a*, 34*b* are fixedly connected to the frame 22 of the stretcher 21. Specifically, the connector unit 34*a* is connected to one lateral side of the frame 22, and the connector unit 34*b* is connected to the other lateral side of the frame 22. In stretchers having more than one frame, the connector units 34*a*, 34*b* are configured to be connected to the stretcher in an oppositely-facing manner. As the connector units 34*a*, 34*b* are similar (mirror-images of one another), only the connector unit 34*a* will be described in detail herein.

The connector unit 34*a* has a stretcher attachment portion 120 that is removably attachable to the stretcher 21 and a support unit attachment portion 122 that is removably attachable to the support foot 60*a*. The stretcher attachment portion 120 and the support unit attachment portion 122 are removably attachable to one another.

The stretcher attachment portion 120 defines a channel 124 that extends along a length of the stretcher attachment portion 120. The channel 124 is sized to surround a side rail 25 of the frame 22. The stretcher attachment portion 120 is then connected to the side rail 25 of the frame 22 by fasteners. It is contemplated that in some embodiments, the stretcher attachment portion 120 could be connected to the side rail 23 of the frame 22 in a different manner.

The support unit attachment portion 122 includes a part 140, a part 142 and the inter-engageable element 144. The parts 140, 142, which are longitudinally spaced from one another, are interconnected by the inter-engageable element 144 and are removably connected to the stretcher attachment portion 120. Although the part 140 is somewhat larger than the part 142, the parts 140, 142 are similar to one another. Hence, only the part 140 will be described in detail herein.

The part 140 has a lower section 144 extending generally horizontally and a side section 146 extending generally vertically, such that the part 140 generally forms an L-shape when seen from a rear elevation view. Upper slots 150*a*, 150*b* are defined on a top of the side section 144, and lower slots 152*a*, 152*b* are defined on a top of the lower section 144. The upper and lower slots 150*a*, 150*b*, 152*a*, 152*d* extend laterally, which enables a lateral adjustment between the support unit attachment portion 122 and the respective stretcher attachment portions 120. In other words, the upper and lower slots 150*a*, 150*b*, 152*a*, 152*d* enable the support assembly 30 to connect to a variety of stretchers 21, patient supports and/or other patient transportation systems. Indeed, various stretcher 21 can have varying width such that the distance between the stretcher attachment portions 120 of the connector units 34*a*, 34*b* can vary from one stretcher to another. The upper and lower slots 150*a*, 150*b*, 152*a*, 152*d* enable the support unit attachment portion 122 to be laterally adjusted relative to their respective stretcher attachment portions 120 to connect with the support unit 30.

The part 140 differs from the part 142 in that the part 142 has a flange 154 defining a flange aperture 156. As will be described below, the flange aperture 156 is configured to receive the hook portion 118 when the locking assembly 86 is in the locked position. Additionally, the part 142 also defines a pin receiving aperture 158 on the top of the side section 144, which, as shown in FIGS. 6 and 9, is configured to receive the stopping pin 170. The parts 140, 142 are configured so that when the connector unit 34 is connected to the support unit 30, there is a clearance region between the parts 140, 142 and the support foot 60*a* to minimize chances of something, such as a finger or a cable, getting trapped therebetween. In some instances, the clearance region measures about 25 mm.

The parts 140, 142 are inter-connected by the inter-engageable element 144, which is configured to engage with channel 62. The inter-engaging element 144 is a rail 144. The rail 144 is connected to the side sections 146, at outer sides thereof. It is contemplated that in some embodiments, the rail 144 could be connected to an inner side of the side sections 146. The rail 144 has rail necks 160 and a rail head 164. The rail necks 160 connects the rail 144 to the parts 140, 142. The rail head 164 has a height greater than a height of the rail necks 160.

The support unit attachment portion 122 also includes a roller 148 that is connected to the part 140, adjacent to the rail 144. The roller 148 is positioned so that when the support unit 32 is connected to the connector units 34*a*, 34*b*, and the support assembly 30 is in the retracted position, the roller 148 is spaced from the roller 68. This can assist in providing smoother movement between the support unit 32 and the connector units 34*a*, 34*b*.

The support assembly 30 also includes stopping pins 170 that are configured to be received in the pin receiving apertures 158 of the connectors 34*a*, 34*b*. It is contemplated that the stopping pins 170 could be other stop members. When the stopping pins 170 are received in their respective pin receiving apertures 158, and the support unit 32 reaches the extended position, the abutting portions of the connectors 34*a*, 34*b* can abut the stopping pins 170.

On the head end 21*a* of the stretcher 21 (i.e., opposite to the support assembly 30 at the foot end), the stretcher assembly 20 has two stretcher poles 180*a*, 180*b*. Specifically, the stretcher poles 180*a*, 180*b* are connected to the frame 22 of the stretcher 21. The stretcher poles 180*a*, 180*b* extend in the vertical direction, and are intended for assisting a user to move the stretcher 21 in an ergonomic fashion. Specifically, when the frame 22 is adjusted to the lower position, the user can move the stretcher without having to bend down. It is contemplated that in some embodiments, the stretcher poles 180*a*, 180*b* could be omitted.

Figure 3:
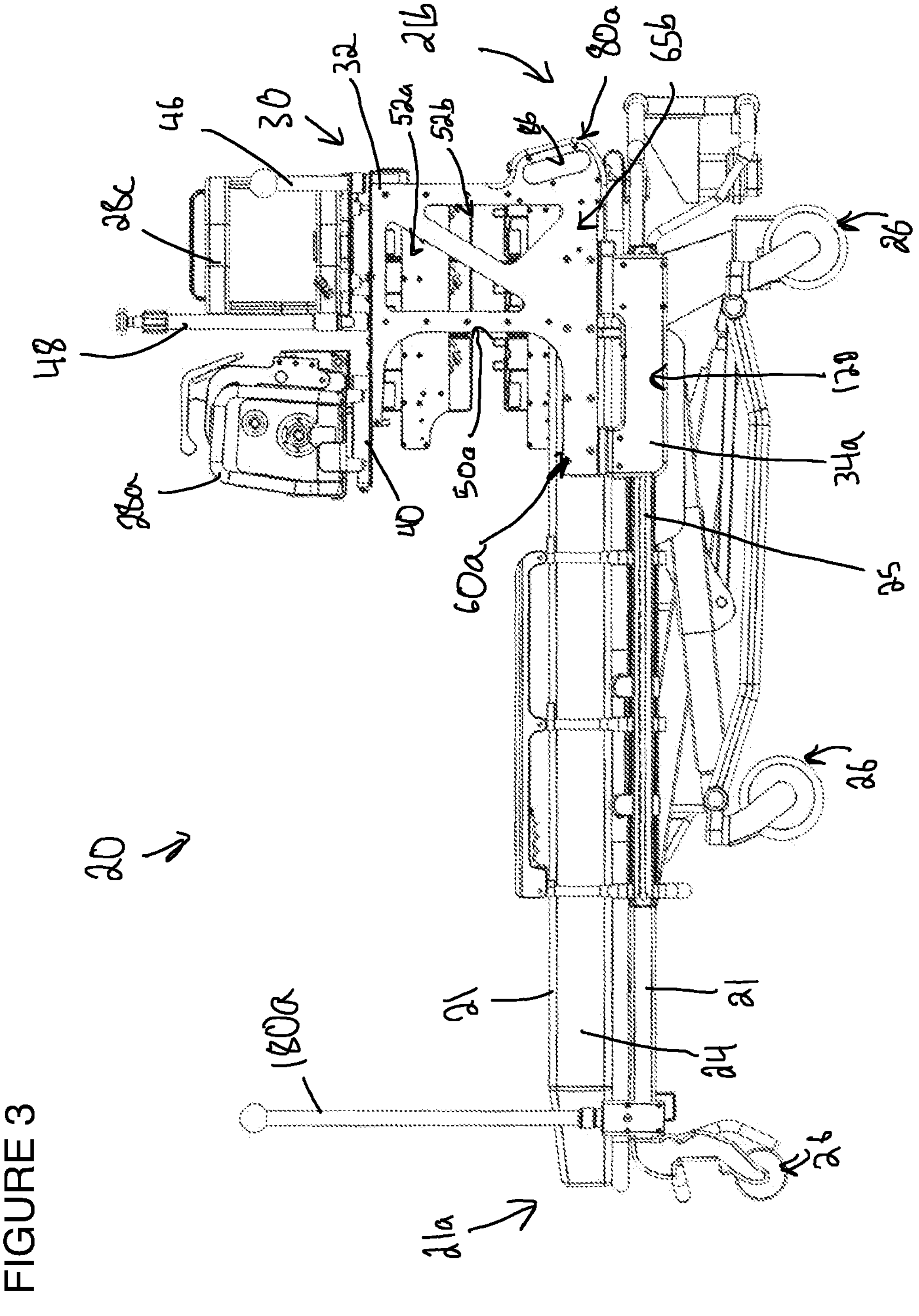
FIG. 3 is a right side elevation view of the support assembly and stretcher of FIG. 1.
Figure 4:
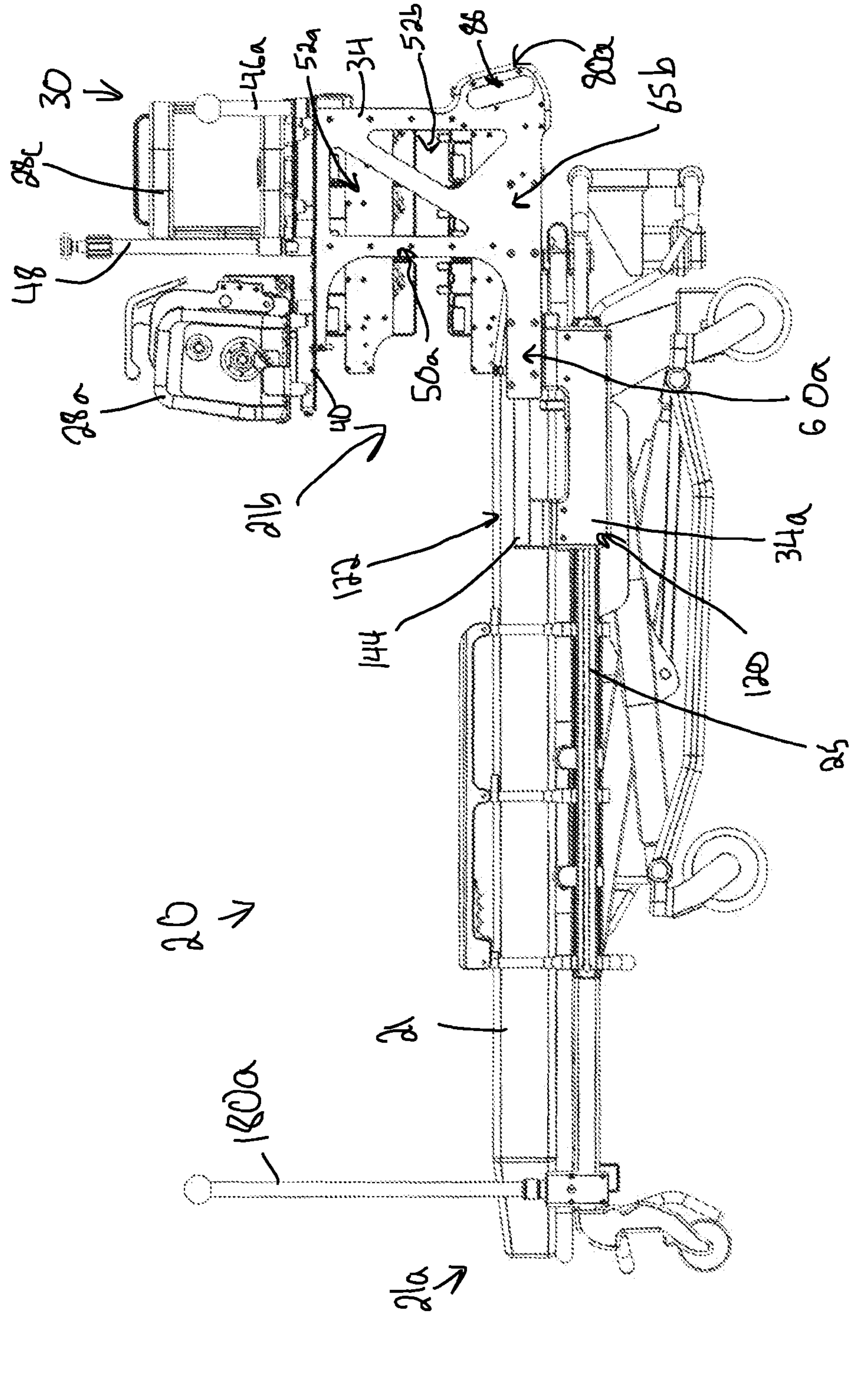
FIG. 4 is a right side elevation view of the support assembly and the stretcher of FIG. 1, with the support assembly being in an extended position.
Figure 5:
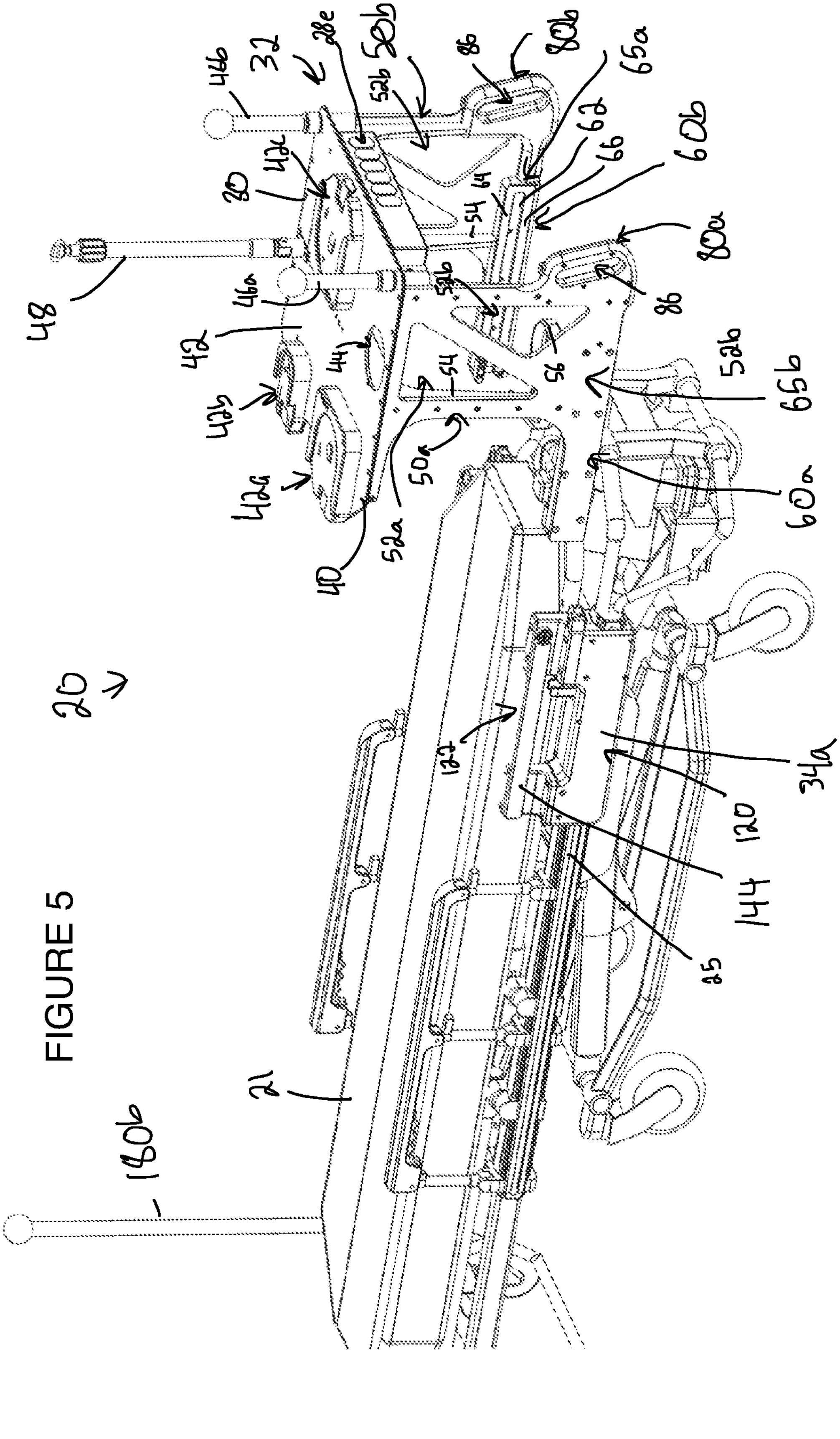
FIG. 5 is a perspective view taken from a top, rear, right side of the support assembly and stretcher of FIG. 1, with the support assembly being disconnected from the stretcher and the medical equipment being removed from the support assembly.

Referring to FIGS. 3 to 5, a description of the support unit 32 being connected to the connector units 34*a*, 34*b* and a description of the support unit 32 moving between the extended and retracted positions will now be provided.

Once the connector units 34*a*, 34*b* are connected to the stretcher 21, the support unit 32 can be selectively connected to the connector units 34*a*, 34*b*. In certain embodiments, before connecting the support unit 32 to the connector units 34*a*, 34*b* and depending on the exact configurations of the stretcher 21 and the devices, it may be preferable to remove the devices from the shelf 40 of the support unit 32 and adjust the frame 22 of the stretcher 21 to the lower position. This can facilitate connection between the support unit 32 to the connector units 34*a*, 34*b*. Additionally, the stopping pins 170 are removed from their respective pin receiving apertures 158.

Then, as shown in FIG. 5, the channel 62 of the support foot 60*a* is aligned with the rail 144 of the connector unit 34*a*, and the channel 62 of the support foot 60*b* is aligned with the rail 144 of the connector unit 34*b*. The channel 62 of the support foot 60*a*, and the rail 144 of the connector unit 34*a* are parallel with the channel 62 of the support foot 60*b*, and the rail 144 of the connector unit 34*b*. Furthermore, the channels 62 of the support feet 60*a*, 60*b* and the rails 144 of the connector units 34*a*, 34*b* are generally parallel to the support surface 42 of the shelf 40.

The rails 144 are then received in their respective channels 62 through the open-ends 67*a* thereof, and moved (e.g., slid) relative to one another until the rollers 148 abut the closed-end 67*b* of their respective channels 62, as shown in FIG. 3. This movement is along a plane that is generally perpendicular to the support surface 42. In the present embodiment, the rollers 148 abutting the closed-end 67*b* of their respective channels 62 coincides with the support unit 32 being in the retracted position. The movement of the rails 144 in the channels 62 is assisted by the rollers 68, 148. It is to be noted that once the rails 144 are received in the channels 62, the rail heads 164 are received in the channels 62, and the rail necks 160, 162 extend between the upper and lower lipped edges 64, 66 of the respective channels 62. This configuration can prevent the support unit 32 from moving laterally relative to the connector units 34*a*, 34*b*. It is to be noted that while the support unit 32 is moving toward the retracted position, the hook portions 118 enter into the flange apertures 156 without needing to lift the hook portions 118 (i.e., without requiring to adjust the locking assembly 86 to the unlocked position), due to the tapered edge 119 of the hook portions 118. Indeed, as the support unit 32 is being moved toward the connector units 34*a*, 34*b*, the tapered edges 119 abut the flanges 154 and cause the hook portions 118, and thus the latch members 100, to move. Eventually, when the rollers 148 abut the closed-end 67*b* of their respective channels 62, and the rails 144 are fully, longitudinally, received in the channels 62, the support unit 32 is in the retracted position.

Then, the stopping pins 170 are receiving in their respective pin receiving apertures 158.

Once the support unit 32 is attached to the connector units 34*a*, 34*b*, the support unit 32 can be selectively moved between the retracted and extended positions.

Referring to FIG. 3, when the support unit 32 is in the retracted position, provided that the locking assemblies 86 are in their locked positions (i.e., the hook portions 118 are received in their respective flange apertures 156), the support unit 32 is generally fixed relative to the connector units 34*a*, 34*b*, such that if desired, the stretcher assembly 20 can be moved by the handles 80*a*, 80*b*. For ergonomic purposes, for example if the handles 80*a*, 80*b* are too low, the stretcher assembly 20 can be moved by the push bars 46*a*, 46*b* or by the stretcher poles 180*a*, 180*b*.

To selectively move the support unit 30 to the extended position, both of the locking assemblies 86 are to be adjusted to the unlocked position. Thus, as described above, the actuators 104 are actuated, thereby causing the latch members 100 to pivot about the lateral axis 107 such that the hook portions 118 move upwardly, and out of the flange apertures 156. Then, the support unit 32 is moved away from the connector units 30*a*, 30*b*. The actuators 104 can be released once the hook portions 118 are longitudinally clear of the flange apertures 156. Eventually, as the support unit 32 is being moved away from the connector units 30*a*, 30*b*, the abutting portions 70 of the foot supports 60*a*, 60*b* abut the stopping pins 170. In the present embodiment, this abutment indicates that the support unit 32 has reached the extended configuration.

The support unit 32 can then be selectively moved to the retracted position. To do so, the support unit 32 is simply moved toward the connector units 34*a*, 34*b*. As mentioned above, as the support unit 32 is being moved toward the connector units 34*a*, 34*b*, because of the tapered edges 119, the hook portions 118 enter the flange apertures 156 without needing to adjust the locking assemblies 86. It is to be noted that a larger proportion of the rails 144 is received in the corresponding channels 62 in the retracted position compared to the extended position.

To disconnect the support unit 32 from the connector units 34*a*, 34*b*, the stopping pins 170 are removed from their respective pin receiving aperture 158, the locking assemblies 86 are adjusted to the unlocked position, and the support unit 32 is moved away from the connector units 34*a*, 34*b* until the rails 144 are out of the channels 62. In certain embodiments, before disconnecting the support unit 32 from the connector units 34*a*, 34*b* and depending on the exact configurations of the stretcher 21 and the devices, it may be preferable to remove the devices from the shelf 40 of the support unit 32 and adjust the frame 22 of the stretcher 21 to the lower position.

It is understood that once the support assembly 30 is connected to the stretcher 21, the support unit 32 can be moved between the retracted and contracted positions without disconnecting the support unit 32 from the connector units 34*a*, 34*b*.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A support assembly attachable to a patient support, the support assembly comprising:
- a support unit configured to support one or more devices, the support unit comprising:
  - a shelf having a support surface for supporting the one or more devices,
  - two support legs extending downwardly from the shelf and spaced apart from each other, and
  - two support feet, each support foot at a distal end of a respective support leg, comprising an inter-engageable element;
- two connector units removably attachable to the patient support and to the support unit, each connector unit comprising:
  - a patient support attachment portion removably attachable to the patient support; and a support unit attachment portion removably attachable to the support unit, the support unit attachment portion having an inter-engageable element;
  - wherein the inter-engageable element of the support unit attachment portion and the inter-engageable element of the respective support foot are configured to engage with one another and are configured to be moved relative to one another to move the support unit between an extended position and a retracted position when the two connector units are attached to the support unit, wherein the support unit and the connector units are configured such that:
    - in the retracted position, the support unit is vertically aligned with the connector units, and
    - in the extended position, the support unit is displaced longitudinally from the connector units.

2. The support assembly of claim 1, wherein the inter-engageable elements of the support unit attachment portion each comprise:
- a rail on the support unit attachment portion; and
- a channel defined by channel walls in the support foot, the channel configured to receive the rail, the rail and the channel configured such that the rail is moveable longitudinally along the channel.

3. The support assembly of claim 2, wherein when the support unit and the two connector units are connected, each rail is positioned inwardly of a channel base of the respective channel.

4. The support assembly of claim 2, wherein each rail is on an outer surface of each connector unit, and each channel is defined in an inner surface of each support foot.

5. The support assembly of claim 4, wherein each rail includes a rail neck connecting each rail to the outer surface of the connector units, and the channel walls include a longitudinal opening along one side which is configured to receive the rail neck when each rail is received in the channel.

6. The support assembly of claim 2, wherein each channel has a first channel end which is open, and each rail has a first rail end and a roller at the first rail end, the first rail end and the roller receivable in the first channel end.

7. The support assembly of claim 2, wherein the support unit and the connector units are configured such that a larger proportion of the rail is received in the channel in the retracted position compared to the extended position.

8. The support assembly of claim 1, wherein the inter-engageable elements of the support unit attachment portion are configured to slide relative to each other along a plane, the plane being perpendicular to the support surface of the shelf.

9. The support assembly of claim 1, wherein the inter-engageable elements of each support unit attachment portion and the respective support foot are generally parallel to the support surface of the shelf.

10. The support assembly of claim 1, wherein each support leg is substantially transverse to the support surface of the shelf.

11. The support assembly of claim 1, further comprising a locking assembly for locking positions of the support unit and the connector units in one or both of the retracted position and the extended position.

12. The support assembly of claim 11, wherein the locking assembly comprises:

corresponding latch members on the support unit and the connector units, a resilient member biased toward a locked position in which the latch members are engaged, and an actuator, which when actuated causes the latch members to dis-engage in an unlocked position.

13. The support assembly of claim 12, further comprising a handle extending from at least one of the support feet or the support legs of the support unit and wherein the actuator is a button disposed on an upper surface of the handle.

14. The support assembly of claim 1, further comprising a handle extending from at least one of the support feet or the support legs of the support unit.

15. The support assembly of claim 1, further comprising at least one stop member extendable from the support unit to at least one of the connector units to maintain engagement of the inter-engageable elements.

16. The support assembly of claim 1, further comprising a connector attached to the support surface, the connector configured to removeably attach one of the one or more devices thereto.

17. The support assembly of claim 1, further comprising a foldable cylinder support attached to one of the support legs.

18. The support assembly of claim 1, further comprising at least one infusion pump fixation attached to one of the support legs.

19. A patient support assembly comprising:

a stretcher having a frame, the stretcher having a head end and a foot end, a support assembly connected to the frame of the stretcher at the foot end, the support assembly comprising:

a support unit configured to support one or more devices, the support unit comprising:

a shelf having a support surface for supporting the one or more devices, two support legs extending downwardly from the shelf and spaced apart from each other, two support feet, each support foot at a distal end of a respective support leg, each support foot having an inter-engageable element;

two connector units removably attachable to the stretcher and to the support unit, each connector unit comprising:

a patient support attachment portion removably attachable to the stretcher; and a support unit attachment portion removably attachable to the support unit, the support unit attachment portion having an inter-engageable element;

wherein the inter-engageable element of the support unit attachment portion and the inter-engageable element of the respective support foot are configured to engage with one another and are configured to be moved relative to one another to move the support unit between an extended position and a retracted position when the two connector units are attached to the support unit, and when the support assembly is in the retracted position, the support unit is vertically above the foot end of the stretcher, and when the support assembly is in the extended position, the support unit extends beyond the foot end of the stretcher.

* * * * *